United States Patent [19]

Metivier et al.

[11] Patent Number: 5,295,041
[45] Date of Patent: Mar. 15, 1994

[54] MODULAR CONSTRUCTION DISTRIBUTION SWITCHBOARD SYSTEM CUBICLES WITH DRAW-OUT AND FIXED APPARATUS MOUNTING FLEXIBILITY

[75] Inventors: Paul A. Metivier, Cary; Joseph Juliano, Raleigh, both of N.C.

[73] Assignee: Siemens Energy & Automation, Inc., Alpharetta, Ga.

[21] Appl. No.: 923,199

[22] Filed: Jul. 31, 1992

[51] Int. Cl.$^5$ ............................................. H02B 1/04
[52] U.S. Cl. ................................. 361/622; 312/257.1; 312/265.1; 361/608; 361/725; 361/829
[58] Field of Search ............ 200/50 AA; 211/26, 189, 211/195, 206; 312/140, 257.1, 263, 265.1; 361/332, 334, 335, 336, 338, 341, 342, 356, 357, 363, 390, 391, 427, 429

[56] References Cited

U.S. PATENT DOCUMENTS

| | | | |
|---|---|---|---|
| 2,756,369 | 7/1956 | Gorrie | 361/334 |
| 2,959,715 | 11/1960 | Leonchick | 361/335 |
| 3,378,320 | 4/1968 | Morgan | 312/108 |
| 4,040,694 | 8/1977 | Lascarrou | 312/263 |
| 4,114,336 | 9/1978 | Bechet | 52/280 |
| 4,814,942 | 3/1989 | Robirds | 361/337 |
| 4,862,324 | 8/1989 | Kalvaitis | 361/390 |
| 4,869,380 | 9/1989 | Metcalfe | 361/429 |

Primary Examiner—Gerald P. Tolin
Attorney, Agent, or Firm—Peter A. Luccarelli, Jr.

[57] ABSTRACT

A distribution switchboard cubicle has upper and lower ring channels; left and right corner posts attached to the ring channels for forming a support skeleton for a front face of the cubicle; and left and right intermediate posts attached to the ring channels for forming in conjunction with a corresponding corner post and the ring channels a support skeleton for left and right sides of the cubicle. First and second vertically aligned, selectively reconfigurable cubicle sections are defined within the cubicle. The first cubicle section includes at least one generally horizontally oriented mounting member for connecting each pair of corner and intermediate posts on the left and right sides of the cubicle. Left and right breaker mounting angles are connected to each respective horizontally oriented mounting member for mounting a first electrical apparatus thereto. The second cubicle section includes a draw-out cradle for mounting a second electrical apparatus therein in a reciprocable fashion, left and right generally elongated rear cradle mounting angles connected generally parallel to a corresponding intermediate post and to a rear face of the draw-out cradle, and left and right front cradle mounting plates connected to a front portion of the draw-out cradle and a corresponding corner post.

15 Claims, 7 Drawing Sheets

MODULAR CONSTRUCTION DISTRIBUTION SWITCHBOARD SYSTEM CUBICLES WITH DRAW-OUT AND FIXED APPARATUS MOUNTING FLEXIBILITY

BACKGROUND OF THE INVENTION

The present invention relates to electrical power distribution switchboard cubicles and in particular, the cubicle structural members which support electrical apparatus housed within the cubicles.

Electrical power distribution and circuit protection apparatus are often housed within cubicles. A cubicle cabinet is often configured in vertically stacked sections, wherein separate apparatus are stacked one on top of the other. Each cabinet section is generally separated by a horizontal barrier, often constructed of sheet metal. Power is distributed to each apparatus in the vertical section by way of vertically aligned section busses. In many field installations, cubicle cabinet sections are aligned next to each other to make a row of cabinets. Power is distributed from one cubicle to the next by way of so-called through busses that are generally horizontally aligned and connected to the vertical bus. In this way, a row of separate cubicle cabinets has a network of vertically aligned section busses and horizontally aligned through busses which form a grid-like pattern. Electrical apparatus cubicles are sold by the Electrical Apparatus Division of Siemens Energy & Automation, Inc. as well as by other manufacturers.

Individual cubicle cabinets, such as those sold by the Electrical Apparatus Division of Siemens Energy & Automation, Inc., are often constructed with supporting frame skeletons which distribute horizontal and vertical loads. Exposed surfaces of the cubicle are often sheathed with protective side panels to inhibit entry of contaminants therein and inadvertent contact of live electrical components by maintenance personnel.

Distribution switchboard cubicles often mount and support electrical apparatus, such as insulated case circuit breakers for motor control equipment and relays, in two common configurations. One commonly employed and known configuration is the so-called fixed mount, wherein the electrical apparatus is rigidly attached to the cubicle, such as by way of nuts and bolts or other known fasteners.

Another known and commonly employed electrical apparatus mounting system within cubicles is by way of draw-out cradles. The cradle is often constructed as a generally box-like sheet metal structure with reciprocable slides built into the side walls of the cradle structure. An electrical apparatus, such as an insulated case circuit breaker, is affixed to the slidable rails, so that the apparatus can be moved in and out of the cabinet on the rails. When the electrical apparatus is inserted fully into the cubicle, a hinge-mounted door is closed to prevent inadvertent entry into the front of the cubicle.

A need exists for flexible cubicle construction which allows ready conversion by qualified service technicians from fixed-type apparatus mount to draw-out-type cradle apparatus mount in a cubicle and vice versa with a minimum of parts and labor effort.

A need also exists for cubicles which allow simultaneous use of the draw-out cradle attachment and fixed attachment apparatus in a stacked array within the same vertical cubicle section. Up to now, cubicles have only been offered with all electrical apparatus held by fixed mounts or all apparatus held within draw-out mounts. Some applications would benefit from a flexible, reconfigurable cubicle which would allow simultaneous use of fixed and draw-out apparatus mounts.

These needs for flexible, distribution switchboard system reconfigurable cubicles which allow simultaneous use of fixed and draw-out apparatus mounts with a minimum of conversion parts have been attained by the present invention.

SUMMARY OF THE INVENTION

The present invention is directed to a distribution switchboard cubicle which has upper and lower ring channels, left and right corner posts attached to the ring channels for forming a support skeleton for a front face of the cubicle, and left and right intermediate posts attached to the ring channels for forming in conjunction with a corresponding corner post and the ring channels a support skeleton for left and right sides of the cubicle. First and second vertically aligned, selectively reconfigurable cubicle sections are defined within the cubicle. The first cubicle section includes at least one generally horizontally oriented mounting member for connecting each pair of corner and intermediate posts on the left and right sides of the cubicle. Left and right breaker mounting angles are connected to each respective horizontally oriented mounting member for mounting a first electrical apparatus thereto. The second cubicle section includes a draw-out cradle for mounting a second electrical apparatus therein in a reciprocable fashion, left and right generally elongated rear cradle mounting angles connected generally parallel to a corresponding intermediate post and to a rear face of the draw-out cradle, and left and right front cradle mounting plates connected to a front portion of the draw-out cradle and a corresponding corner post.

The present invention is also directed to a distribution switchboard cubicle having upper and lower ring channels having a generally rectangular outer planform, left and right front corner posts attached to the ring channels for forming a support skeleton for a front face of the cubicle, left and right rear corner posts attached to the ring channels for forming a support skeleton for a rear face of the cubicle, left and right intermediate posts symmetrically attached to the ring channels between the corner posts for forming in conjunction therewith and the ring channels a support skeleton for left and right sides of the cubicle. First and second vertically aligned, selectively reconfigurable cubicle sections defined within the cubicle. The first section includes generally identical upper and lower generally horizontally oriented mounting members for connecting each respective pair of corner and intermediate posts on the left and right sides of the cubicle. Left and right breaker mounting angles are connected to each respective pair of horizontally oriented upper and lower mounting members for mounting a first electrical apparatus thereto in a fixed, non-reciprocating manner. The second section includes a draw-out cradle, left and right generally elongated rear cradle mounting angles connected generally parallel to a corresponding intermediate post and to a rear face of the draw-out cradle, and left and right front cradle mounting plates connected to a front portion of the draw-out cradle and a corresponding corner post.

The present invention is also directed to a distribution switchboard cubicle having upper and lower ring channels having a generally rectangular planform, left and right front corner posts attached to the ring channels for forming a support skeleton for a front face of the cubicle, left and right rear corner posts attached to the ring channels for forming a support skeleton for a rear face of the cubicle, left and right intermediate posts symmetrically attached to the ring channels between the corner posts for forming in conjunction therewith and the ring channels a support skeleton for left and right sides of the cubicle and first and second vertically aligned selectively reconfigurable cubicle sections defined within the cubicle containing therein first and second insulated case circuit breakers, respectively. The first section includes identical upper and lower generally horizontally oriented mounting angle members for connecting symmetrically each respective pair of corner and intermediate posts on the left and right sides of the cubicle, left and right symmetrical breaker mounting angles connected to each respective pair of horizontally oriented upper and lower mounting members for mounting the first insulated case circuit breaker thereto in a fixed, non-reciprocating manner, left and right symmetrical breaker cover mounting angles connected to each respective pair of horizontally oriented upper and lower mounting members, and a breaker cover panel attached to the left and right breaker cover mounting angles over the first insulated case circuit breaker. The second section includes a draw-out cradle having coupled therein the second insulated case circuit breaker, left and right generally elongated, identical rear cradle mounting angles connected generally parallel to a corresponding intermediate post and to a rear face of the draw-out cradle, and left and right symmetrical front cradle mounting plates connected to a front portion of the draw-out cradle and a corresponding corner post.

The invention may be better understood by reference to the accompanying drawings the more detailed verbal description thereof.

DESCRIPTION OF THE PREFERRED EMBODIMENTS

Figure 1:
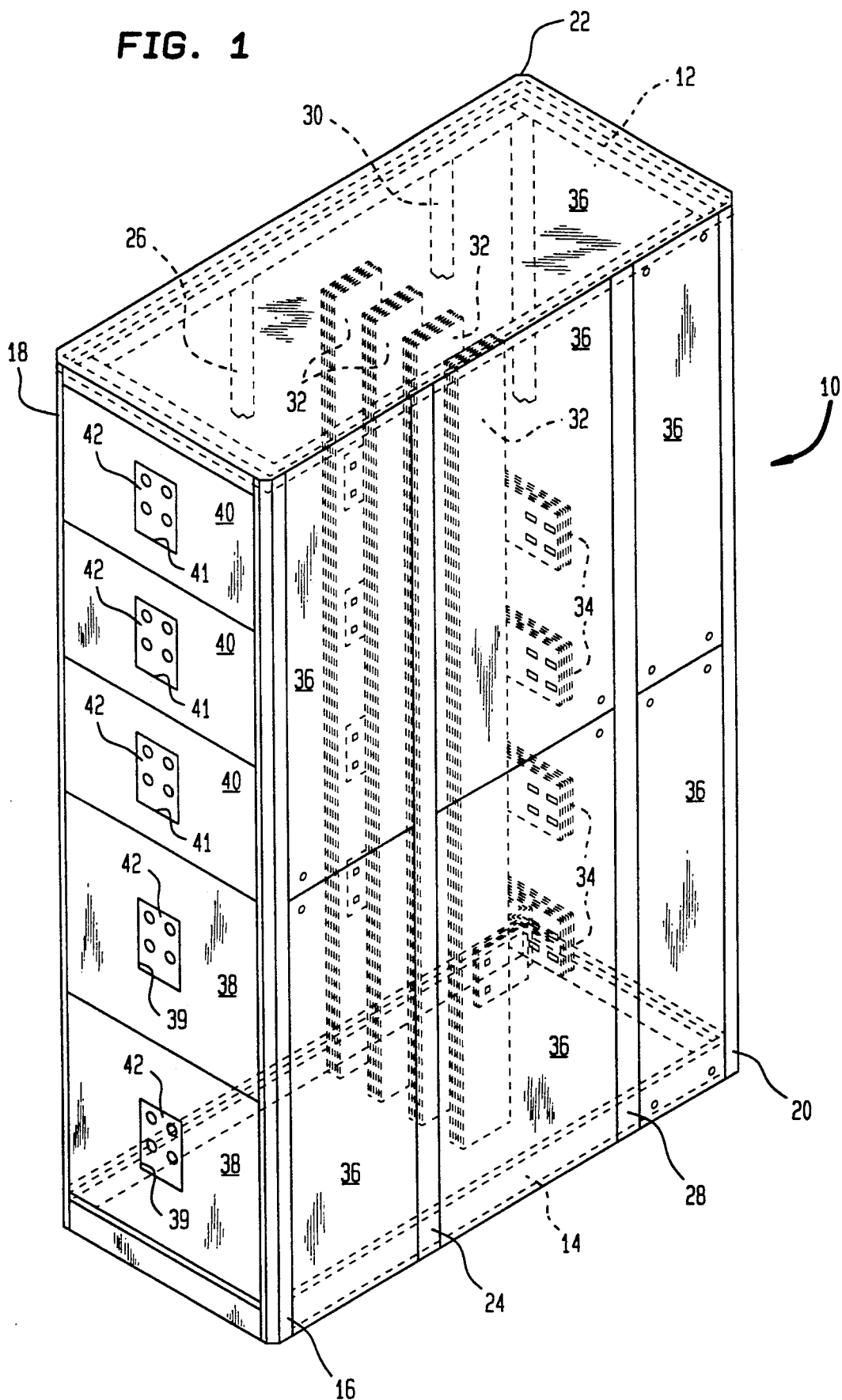
FIG. 1 is an right front isometric view of a cubicle cabinet of the present invention showing the structural skeletal components which support electrical apparatus contained in the cubicle and a representative example of section busses and through busses which distribute power to electrical apparatus.
Figure 2:
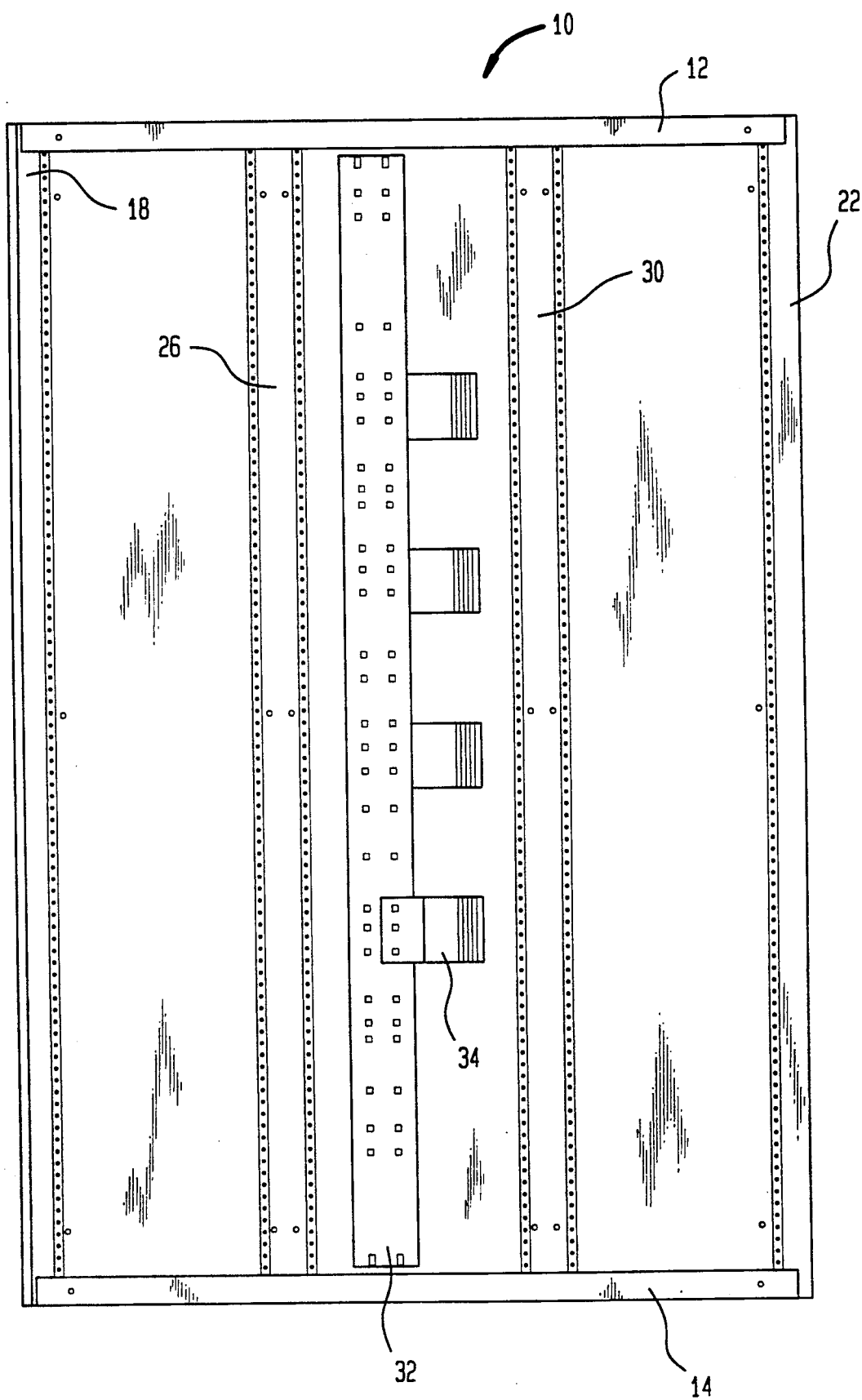
FIG. 2 is a right side elevational view of the inside of the cabinet taken between the neutral section bus and the right side of the cabinet frame, looking inside the cabinet towards the left side of the cabinet.

FIGS. 1 and 2 show generally a distribution switchboard 5, cubicle 10 of the present invention. The cubicle 10 has a structural skeleton including an upper ring channel 12 and lower channel ring 14, each having a generally rectangular outer planform. The ring channels 12, 14 establish the perimeter boundaries of the cubicle in the plan view.

Vertical support in the cubicle is provided by the right front corner post 16, left front corner post 18, right rear corner post 20, left rear corner post 22, the right front intermediate post 24, the left front intermediate post 26, right rear intermediate post 28 and the left rear intermediate post 30. Each end of the posts 16-30 is attached to a respective ring channel 12-14 by means of fasteners.

When fasteners are described herein, it should be understood that they are of any type commonly employed by those skilled in the art of electrical distribution switchboard cubicles for the applications described herein. Such commonly employed fasteners include nuts, bolts and locking or standard washers; self-threading bolts; and screws.

The cubicle also houses vertically oriented section busses 32 which provide power vertically through the entire cubicle. By way of example, four separate section busses are shown for three phases of power and neutral. The cubicle may also contain through busses 34 with each through bus separately connected to a respective section bus 32 for transfer of power to adjoining cubicles that are placed in side by side relationship to each other. The construction of the power distribution busses 32-34 are only shown any known power by way of example. It is contemplated that distribution bus arrangement may be used in the cubicle of the present invention, in conjunction with connectors for transferring power from the busses to electrical apparatus within the cubicle. It is desirable, but not required for the section busses 32 to be configured with a plurality of bolt holes (not shown) spaced axially along at least a portion of the length of the bus in order to accommodate a number of different centerline spacing for apparatus connectors.

Exposed surfaces of the cubicle are clad with cover panels 36 in order to inhibit passage of contaminants into the cubicle interior and inadvertent contact with current carrying electrical components by service personnel.

As shown in FIG. 1, the cubicle is divided into vertically aligned sections which may house separate electrical distribution apparatus. Examples of electrical distribution apparatus include insulated case circuit breakers, motor relays, motor control equipment and the like.

Each separate vertically aligned section of the cubicle commonly has a front covering device. As shown in FIG. 1, the bottom two cubicle sections have hinged draw-out cubicle doors 38, each defining a window 39. The three top-most cubicle sections have fixed mount covers 40 each defining a cover window 41. The fixed mount covers 40 are affixed to the cubicle with fasteners. The cubicle windows 39 and the cover windows 41 allow access by service personnel to electrical apparatus actuation devices, such as ON-OFF switch buttons and the like.

The cubicle 10 ring channels 12, 14 corner posts 16, 18, 20, 22 and intermediate posts 24, 26, 28 and 30 are standard, known switchboard cubicle components sold by the Electrical Apparatus Division of Siemens Energy & Automation, Inc. Similarly, the section busses 32 and through busses 34 along with all hardware for connecting the busses to electrical apparatus contained within the cubicle that is not shown in FIGS. 1 and 2 are also sold by the Electrical Apparatus Division of Siemens Energy & Automation, Inc.

The cubicle 10 shown in FIG. 1 has draw-out cubicle sections and fixed-mount cubicle sections in the same vertical cabinet. The mounting structural members which enable simultaneous use of both draw-out and fixed-mounting systems in the same cabinet will now be described with reference to FIGS. 3 and 4.

Figure 3:
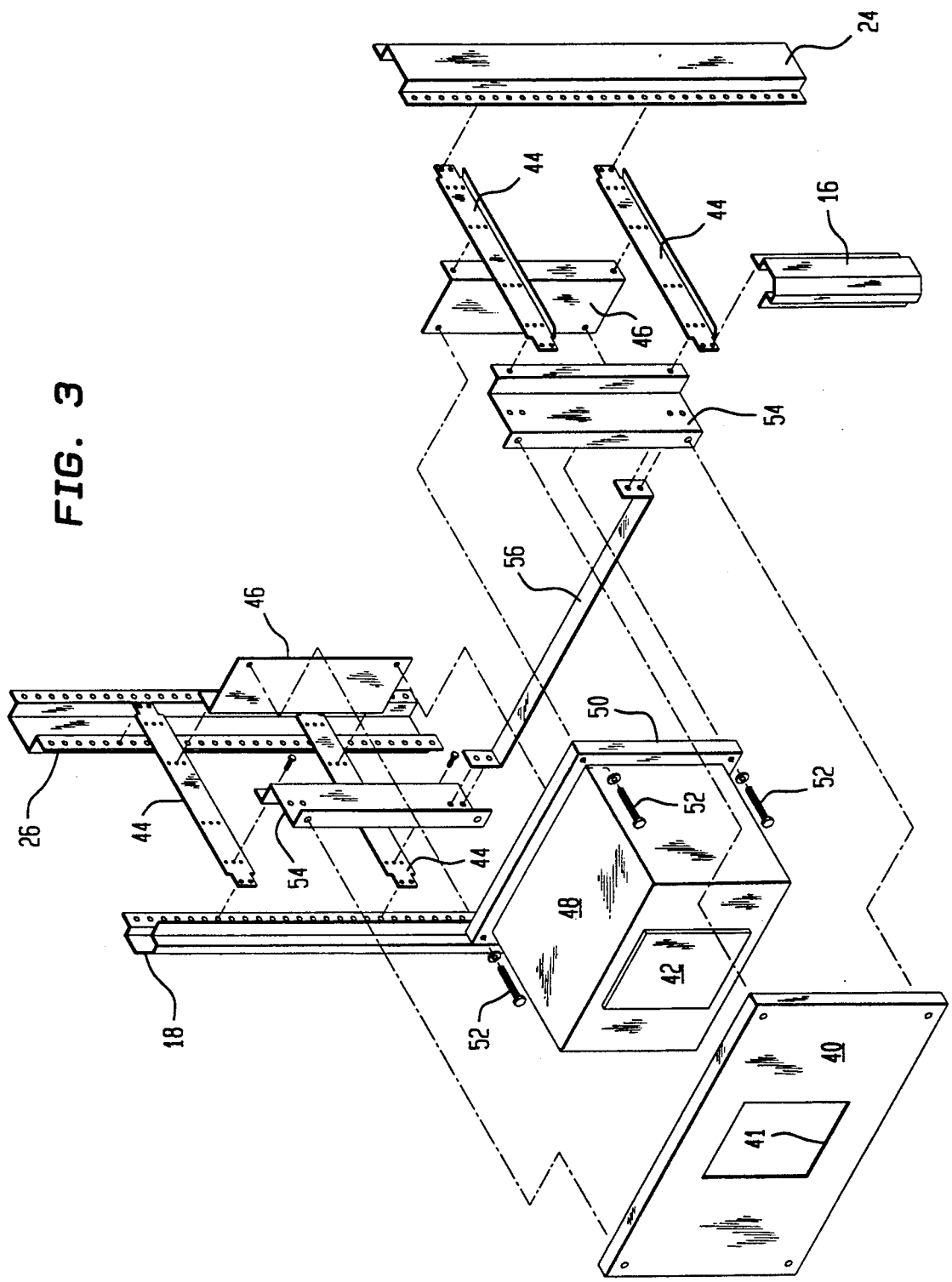
FIG. 3 is an isometric exploded schematic view of the present invention showing a fixed-mount installation of an insulated case circuit breaker.

FIG. 3 shows the structural members which accomplish fixed mounting of electrical distribution apparatus in cubicle 10. Horizontal mounting members, also called horizontal mounting angles 44 span between each left and right respective pair of corner posts 16, 18 and its corresponding front intermediate posts 24, 26. The horizontal mounting angles 44 are shown as identical sheet metal angle stampings which are fastened to the posts 16, 18, 24, 26 with standard threaded fasteners (not shown). While a pair of horizontal mounting angles 44 are shown on each side of the cubicle, in order to minimize material, it is also possible to use a single member on each side of any desired configuration which provides suitable structural rigidity for the intended use of the cubicle.

As is also shown in FIG. 3, a breaker mounting angle 46 is attached on the left and right side of the cubicle to the respective horizontal mounting angles 44. Any suitable standard fastener may be used. An electrical distribution apparatus, such as insulated case circuit breaker 48 shown in FIG. 3, is attached to the breaker mounting angles 46. The representative example of an insulated case circuit breaker is the Siemens Energy & Automation, Inc. Model SB breaker, which as shown has a mounting flange 50 through which is passed rear mounting fasteners 52. The fasteners 52 in turn pass through holes defined by the breaker mounting angles 46. Standard nuts (not shown) would then be attached to the fasteners 52 in order to complete fixed attachment of the breaker 48 within cubicle 10.

Next, left and right cover mounting angles 54 are attached to the horizontal mounting angles 44 near the front thereof. Cover mount support bracket 56 is attached to each of the cover mounting angles 54 again by use of standard fasteners. Fixed mount cover 40 is in turn screwed to the cover mounting angles 54 in order to prevent inadvertent entry of service personnel or foreign objects into the cubicle 10. Window 41 defined by the cover 40 allows actuation of the insulated case circuit breaker by service personnel.

Preferably the horizontal mounting members 44 are all identical in order to minimize the number of parts which must be inventoried for cubicle manufacture. The same holds true for the breaker mounting angles 46, cover mounting angles 54 and cover support bracket 56.

Figure 4:
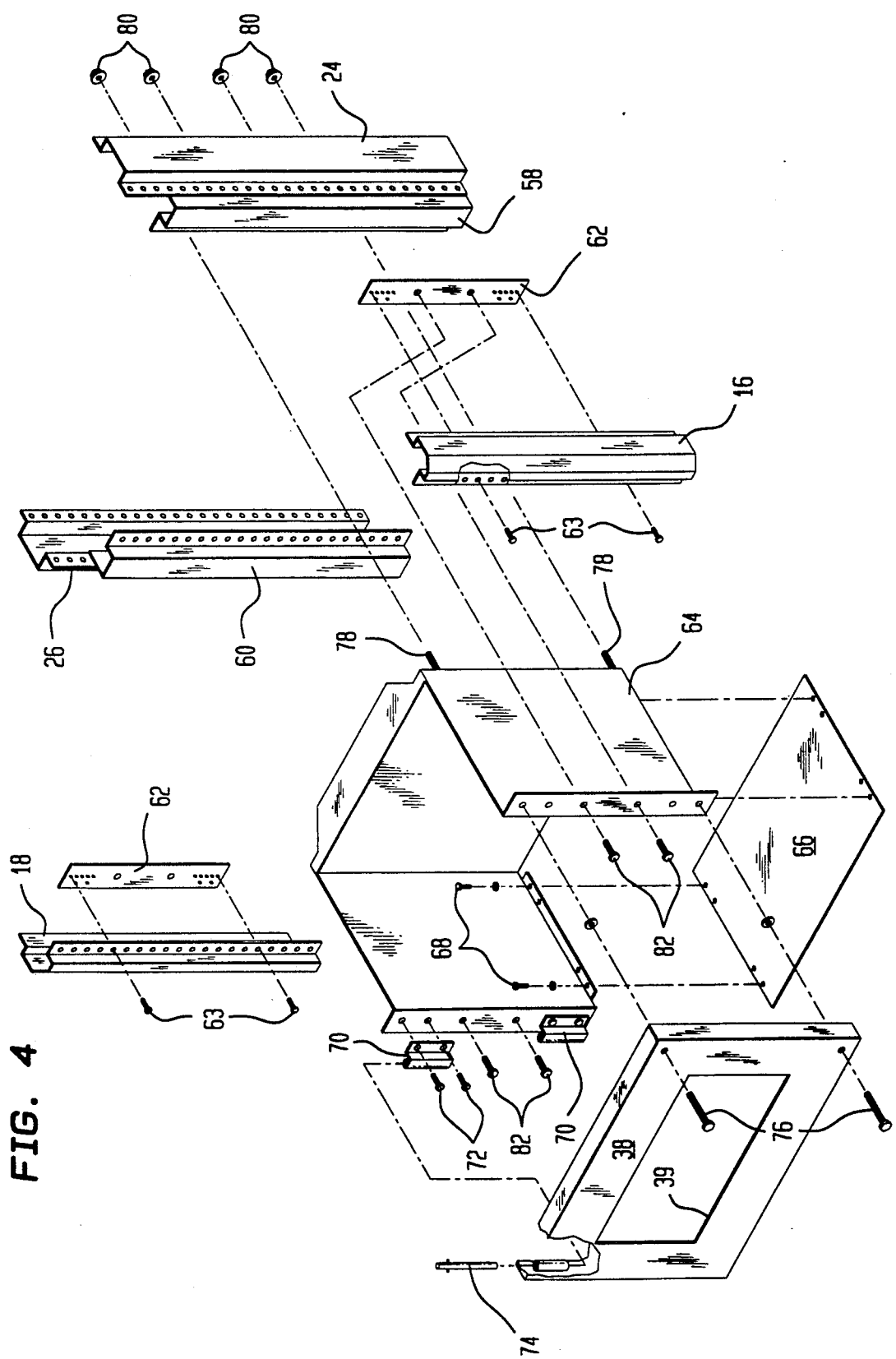
FIG. 4 is an isometric exploded schematic view of the present invention showing a draw-out cradle mount.

Referring now to FIG. 4, there is shown a representative example of a draw-out cubicle section. Right cradle mounting angle 58 is fastened to right front intermediate post 24 by mean of standard fasteners passed through a plurality of holes defined within the post flange. The left cradle mounted angle 60 attaches to the left front intermediate post 26 in identical fashion. The right and left cradle mounting angles 58, 60 preferably are identical in order to minimize the number of types of parts in inventory. The draw-out cradle supporting system also includes left and right front cradle mounting plates 62 which are fastened to a flange defined by right and left corner posts 16, 18 through holes defined by the flange. Standard fasteners 63 are used to fasten the plate 62 to the corner posts 16, 18.

Draw-out cradles 64 are of known construction and are available from the Electrical Apparatus Division of Siemens Energy & Automation, Inc. under catalog numbers SBS 08 DFV and catalog number SBS 20 DFV. As is known in the art, draw-out cradles have reciprocable slide members for attachment of electrical apparatus thereto, such as, by way of example, insulated case circuit breakers (not shown).

As is shown in FIG. 4, the cradle 64 has a drop barrier 66 with standard fasteners 68. Cradle 64 also has a pair of stamped metal hinges 70 attached to a front flange defined by the cradle with standard fasteners 72. Hinge pin 74 attaches the draw-out cubicle door 38 to the cradle 64 in known fashion. Cubicle door 38 is retained in a closed position by standard threaded fasteners 76. Fasteners such as bolts 78 pass through the left and right cradle mounting angles 60, 62 through holes defined in a flange of the cradle mounting angle. The bolts 78 are then secured by nuts 80. Cradle 64 is also attached to the front cradle mounting plate 62 with standard fasteners 82.

Figure 6:
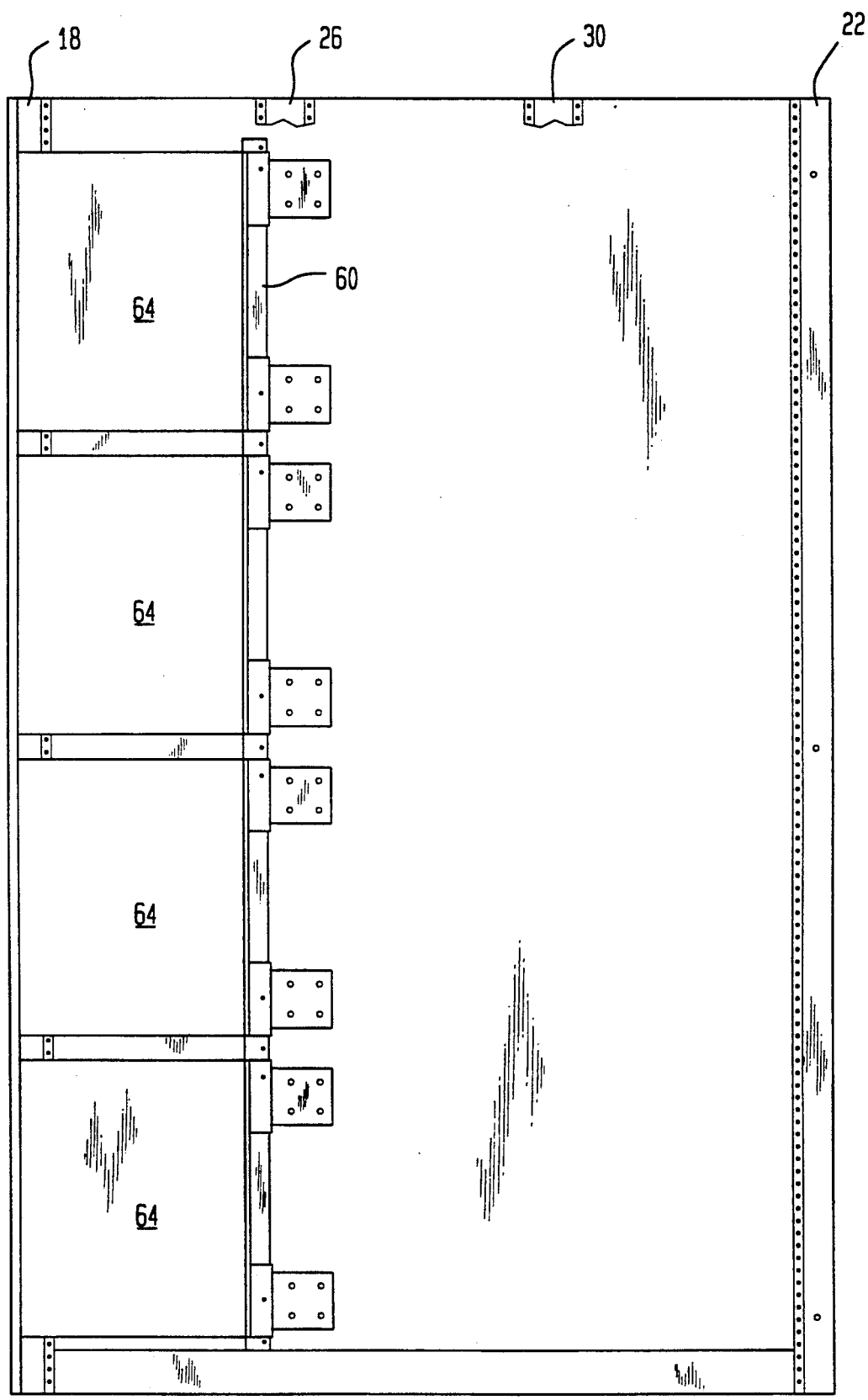
FIG. 6 is a right side elevational view of a cubicle of the present invention showing stacked sections of draw-out cradle mounts for electrical apparatus and no fixed mounts.
Figure 7:
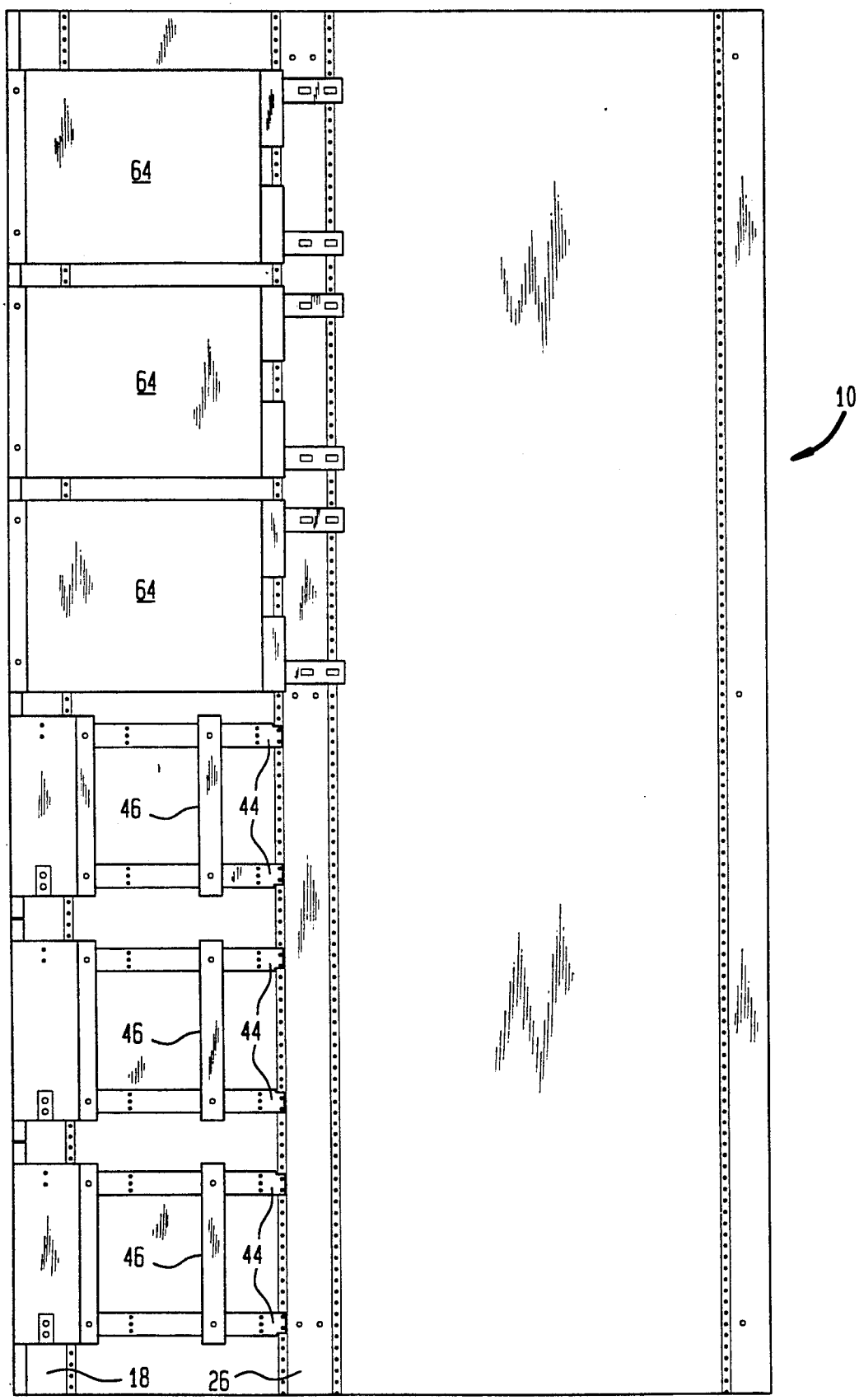
FIG. 7 is a right side elevational view of a cubicle of the present invention with draw-out cradles and fixed mounts for electrical apparatus in the same vertical section, wherein the top half has draw-out cradles and the bottom half has fixed mounts.

The fixed-mount structural components as shown in FIG. 3 and the cradle mounting structural component shown in FIG. 4 enable rapid factory and field configuration of cubicles 10 to allow different combinations of fixed and cradle mount electrical apparatus within a single vertical column in a cubicle. Exemplary applications of various combinations of apparatus mounts are shown in FIGS. 5, 6 and 7.

Figure 5:
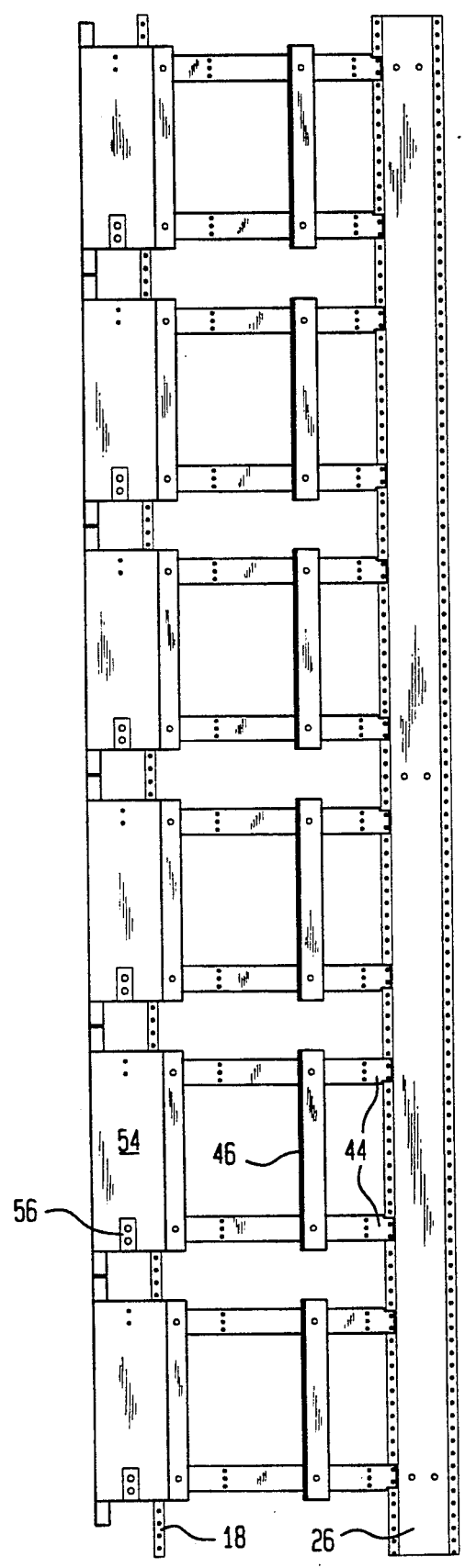
FIG. 5 is a right side elevational view of the front portion of a cubicle of the present invention showing stacked sections of fixed mounted electrical apparatus support structure and no draw-out mounts.

FIG. 5 shows a cubicle configured only for fixed apparatus mounts. FIG. 6 shows a cubicle configured only for draw-out cradle mounts. FIG. 7 shows application of the present invention to configure a single vertical column of the cubicle simultaneously with fixed and cradle draw-out mounts. This mixed mounting application is easily accomplished because the horizontal mounting members 44, breaker mounting angles 46, cover mounting angles 54, and covers 40 may be readily substituted for the cradle mounting angles 58, 60, cradle mounting plates 62, cradle 64, cubicle door 38, etc. through the use of standard fasteners. The fasteners are passed through holes defined in flanges of the corner posts 16, 18 and intermediate posts 24 and 26 in accordance with the design parameters set by the centerline spacing distances between each apparatus in a selected vertical cubicle section.

The flexible switchboard mounting system of the present invention is accomplished with a minimized number of parts, by way of optimization of identical parts for left and right-hand sides of the cabinet, wherever feasible.

While the present invention cubicle 10 has been described by fastening various components thereof together by way of standard fasteners, if desired, the components can be fastened to each other by other known techniques, such as arc welding, spot welding, heli-arc welding, interference fit through interlocking structural components and the like, which are all well known in the art.

While representative examples of the present invention have been described in a preferred embodiment herein, it should be understood by those skilled in the art that the exemplary preferred embodiments are not intended to restrict the scope of invention which is set forth in the claims herein.

What is claimed is:

1. A distribution switchboard cubicle comprising:
   upper and lower ring channels for establishing perimeter boundaries of the cubicle;
   left and right corner posts attached to the ring channels for forming a support skeleton for a front face of the cubicle;
   left and right intermediate posts attached to the ring channels for forming in conjunction with a corresponding corner post and the ring channels a support skeleton for left and right sides of the cubicle;
   first and second vertically aligned, selectively reconfigurable cubicle sections defined within the cubicle, each of the cubicle sections including one of:
   a fixed mounting assembly having generally horizontally oriented mounting members, each mounting member connecting each pair of corner and intermediate posts on the left and right sides of the cubicle, left and right breaker mounting angles connected to each respective horizontally oriented mounting member for mounting a first electrical apparatus thereto; and
   a draw-out mounting assembly having a draw-out cradle for mounting a second electrical apparatus therein in a reciprocable fashion, left and right generally elongated rear cradle mounting angles connected generally parallel to a corresponding intermediate post and to a rear face of the draw-out cradle, and left and right front cradle mounting plates connected to a front portion of the draw-out cradle and a corresponding corner post.

2. The distribution switchboard cubicle recited in claim 1, wherein the corner posts and intermediate posts have a plurality of mounting holes defined therein for selective connection thereto of electrical apparatus mounting hardware within each cubicle section, so that one of horizontally oriented mounting members and rear cradle mounting angles may be selectively mounted to the intermediate posts so as to effect selective first and second cubicle section reconfiguration.

3. The distribution switchboard cubicle recited in claim 2, wherein both the first and second sections have draw-out mounting assemblies, so as to effect a draw-out configuration in both of the cubicle sections.

4. The distribution switchboard cubicle recited in claim 2, wherein both the first and second sections have fixed mounting assemblies, so as to effect a fixed mounting configuration in both of the cubicle sections.

5. The distribution switchboard cubicle recited in claim 1, wherein the first section has a fixed mounting assembly which further comprises left and right symmetrical breaker cover mounting angles connected to each respective pair of horizontally oriented upper and lower mounting members, and a breaker cover panel attached to the left and right breaker cover mounting angles over the first electrical apparatus.

6. A distribution switchboard cubicle comprising:
   upper and lower ring channels having a generally rectangular outer planform for establishing perimeter boundaries of the cubicle;
   left and right front corner posts attached to the ring channels for forming a support skeleton for a front face of the cubicle;
   left and right rear corner posts attached to the ring channels for forming a support skeleton for a rear face of the cubicle;
   left and right intermediate posts symmetrically attached to the ring channels between the corner posts for forming in conjunction therewith and the ring channels a support skeleton for left and right sides of the cubicle;
   first and second vertically aligned, selectively reconfigurable cubicle sections defined within the cubicle, each of the cubicle sections including one of:
   a fixed mounting assembly including: generally identical upper and lower generally horizontally oriented mounting members, each mounting member connecting each respective pair of corner and intermediate posts on the left and right sides of the cubicle, and left and right breaker mounting angles connected to each respective pair of horizontally oriented upper and lower mounting members for mounting a first electrical apparatus thereto in a fixed, non-reciprocating manner; and
   a draw-out mounting assembly including: a draw-out cradle, left and right generally elongated rear cradle mounting angles connected generally parallel to a corresponding intermediate post and to a rear face of the draw-out cradle, and left and right front cradle mounting plates connected to a front portion of the draw-out cradle and a corresponding corner post.

7. The distribution switchboard cubicle recited in claim 6, wherein the corner posts and intermediate posts have a plurality of mounting holes defined therein for selective connection thereto of electrical apparatus mounting hardware within each cubicle section, so that one of horizontally oriented mounting members and rear cradle mounting angles may be selectively mounted to the intermediate posts so as to effect selective first and second cubicle section reconfiguration.

8. The distribution switchboard cubicle recited in claim 7, wherein both the first and second sections have draw-out mounting assemblies, so as to effect a draw-out configuration in both of the cubicle sections.

9. The distribution switchboard cubicle recited in claim 7, wherein both the first and second sections have fixed mounting assemblies, so as to effect a fixed mounting configuration in both of the cubicle sections.

10. A distribution switchboard cubicle comprising:
    upper and lower ring channels having a generally rectangular planform for establishing perimeter boundaries of the cubicle;
    left and right front corner posts attached to the ring channels for forming a support skeleton for a front face of the cubicle;
    left and right rear corner posts attached to the ring channels for forming a support skeleton for a rear face of the cubicle;
    left and right intermediate posts symmetrically attached to the ring channels between the corner posts for forming in conjunction therewith and the ring channels a support skeleton for left and right sides of the cubicle;
    first and second vertically aligned, selectively reconfigurable cubicle sections defined within the cubicle containing therein first and second insulated case circuit breakers, respectively, each of the cubicle sections including one of:

a fixed mounting assembly including: identical upper and lower generally horizontally oriented mounting angle members, each angle member connecting symmetrically each respective pair of corner and intermediate posts on the left and right sides of the cubicle, left and right symmetrical breaker mounting angles connected to each respective pair of horizontally oriented upper and lower mounting members for mounting one of the insulated case circuit breakers thereto in a fixed, non-reciprocating manner, left and right symmetrical breaker cover mounting angles connected to each respective pair of horizontally oriented upper and lower mounting members, and a breaker cover panel attached to the left and right breaker cover mounting angles over the insulated case circuit breaker located within the fixed mounting assembly; and a draw-out mounting assembly including: a draw-out cradle having coupled therein one of the insulated case circuit breakers, left and right generally elongated, identical rear cradle mounting angles connected generally parallel to a corresponding intermediate post and to a rear face of the draw-out cradle, and left and right symmetrical front cradle mounting plates connected to a front portion of the draw-out cradle and a corresponding corner post.

11. The distribution switchboard cubicle recited in claim 10, wherein the corner posts and intermediate posts have a plurality of mounting holes defined therein for selective connection thereto of electrical apparatus mounting hardware within each cubicle section, so that one of horizontally oriented mounting members and rear cradle mounting angles may be selectively mounted to the intermediate posts so as to effect selective first and second cubicle section reconfiguration.

12. The distribution switchboard cubicle recited in claim 11, wherein both the first and second sections have draw-out mounting assemblies, so as to effect a draw-out configuration in both of the cubicle sections.

13. The distribution switchboard cubicle recited in claim 11, wherein both the first and second sections have fixed mounting assemblies, so as to effect a fixed mounting configuration in both of the cubicle sections.

14. The distribution switchboard cubicle comprising:
upper and lower ring channels having a generally rectangular outer planform for establishing perimeter boundaries of the cubicle;
left and right front corner posts attached to the ring channels for forming a support skeleton for a front face of the cubicle;
left and right rear corner posts attached to the ring channels for forming a support skeleton for a rear face of the cubicle;
left and right intermediate posts symmetrically attached to the ring channels between the corner posts for forming in conjunction therewith and the ring channels a support skeleton for left and right sides of the cubicle;
first and second vertically aligned, selectively reconfigurable cubicle sections defined within the cubicle;
the first section including:
generally identical upper and lower generally horizontally oriented mounting members, each mounting member connecting each respective pair of corner and intermediate posts on the left and right sides of the cubicle, and
left and right breaker mounting angles connected to each respective pair of horizontally oriented upper and lower mounting members for mounting a first electrical apparatus thereto in a fixed, non-reciprocating manner; and
the second section including:
a draw-out cradle, left and right generally elongated rear cradle mounting angles connected generally parallel to a corresponding intermediate post and to a rear face of the draw-out cradle, and
left and right front cradle mounting plates connected to a front portion of the draw-out cradle and a corresponding corner post.

15. A distribution switchboard cubicle comprising:
upper and lower ring channels having a generally rectangular planform for establishing perimeter boundaries of the cubicle;
left and right front corner posts attached to the ring channels for forming a support skeleton for a front face of the cubicle;
left and right rear corner posts attached to the ring channels for forming a support skeleton for a rear face of the cubicle;
left and right intermediate posts symmetrically attached to the ring channels between the corner posts for forming in conjunction therewith and the ring channels a support skeleton for left and right sides of the cubicle;
first and second vertically aligned selectively reconfigurable cubicle sections defined within the cubicle containing therein first and second insulated case circuit breakers, respectively;
the first section including:
identical upper and lower generally horizontally oriented mounting angle members, each angle member connecting symmetrically each respective pair of corner and intermediate posts on the left and right sides of the cubicle,
left and right symmetrical breaker mounting angles connected to each respective pair of horizontally oriented upper and lower mounting members for mounting the first insulated case circuit breaker thereto in a fixed, non-reciprocating manner,
left and right symmetrical breaker cover mounting angles connected to each respective pair of horizontally oriented upper and lower mounting members, and
a breaker cover panel attached to the left and right breaker cover mounting angles over the first insulated case circuit breaker; and
the second section including:
a draw-out cradle having coupled therein the second insulated case circuit breaker,
left and right generally elongated, identical rear cradle mounting angles connected generally parallel to a corresponding intermediate post and to a rear face of the draw-out cradle, and
left and right symmetrical front cradle mounting plates connected to a front portion of the draw-out cradle and a corresponding corner post.

* * * * *